United States Patent [19]

Langberg

[11] Patent Number: 5,703,905
[45] Date of Patent: Dec. 30, 1997

[54] MULTI-CHANNEL TIMING RECOVERY SYSTEM

[75] Inventor: Ehud Langberg, Ocean, N.J.

[73] Assignee: Globespan Technologies, Inc., Red Bank, N.J.

[21] Appl. No.: 602,944

[22] Filed: Feb. 16, 1996

[51] Int. Cl.$^6$ ............................... H03H 7/30; H03H 7/40
[52] U.S. Cl. ..................... 375/232; 375/326; 375/327; 375/328; 375/355
[58] Field of Search .................................... 375/232, 260, 375/326, 327, 328, 350, 354, 355, 357; 331/1 R; 370/228

[56] References Cited

U.S. PATENT DOCUMENTS

| | | | |
|---|---|---|---|
| 5,274,678 | 12/1993 | Ferolito et al. | 375/357 |
| 5,285,482 | 2/1994 | Sehier et al. | 375/355 |
| 5,353,312 | 10/1994 | Cupo et al. | 375/354 |
| 5,515,403 | 5/1996 | Sloan et al. | 375/357 |
| 5,581,585 | 12/1996 | Takatori et al. | 375/355 |

*Primary Examiner*—Don N. Vo
*Attorney, Agent, or Firm*—Thomas, Kayden, Horstemeyer & Risley

[57] ABSTRACT

An "N" channel receiver system includes "N" A/D converters, one per channel, sampling the data received by their respective channels. The sampling rate of the A/D converters is controlled by a sampling clock signal generated by a timing recovery circuit. One rate of the sampling clock is a function of a timing signal applied to the timing recovery circuit. The system may be configured so that each channel produces N distinct timing signals, corresponding to the data signals received by each one of the N channels. The N distinct timing signals are coupled to a mechanism configured to selectively couple one of the N distinct timing signals to the timing recovery circuit. In a preferred embodiment, the signal-to-noise ratio (SNR) of the N received signals is sensed and the timing signal of the channel having the highest SNR is coupled via the controllable.

25 Claims, 5 Drawing Sheets

MULTI-CHANNEL TIMING RECOVERY SYSTEM

BACKGROUND OF THE INVENTION

This invention relates to data communication systems and, in particular, to a timing recovery system for use in a multi-channel receiver.

Timing recovery refers to, and includes, the generation and/or reconstruction of a clock signal, at a receiver, to sample the incoming signal. The clock signal generated at the receiver end must agree in frequency with the transmitter clock at the sending end, and may also require proper phasing. Timing recovery includes techniques which make use of the received data symbols to help recover timing.

Timing recovery techniques are disclosed, for example, in a publication titled "Digital Communication", Second Edition, by E. A. LEE and D. G. Messerschmitt, published by Kluwer Academic Publishers, 1994. Timing recovery techniques are also disclosed in U.S. Pat. No. 5,353,312 titled Equalizer Based Timing Recovery issued to Cupo et al., assigned to the assignee of this application, whose teachings are incorporated herein by reference.

In a known, prior art, dual channel high bit-rate digital subscriber line (HDSL) transceiver, timing recovery at the receiver end is derived from one of the receiver channels which is defined as the "master" channel. In this mode both receiver channels are operated in a synchronous mode since their timing is derived from a common timing source. A problem with this prior art system is that one of the receiver channels is arbitrarily selected as the "master" channel and the timing (rate) of the sampling clock signals is derived from the arbitrarily selected channel, even though the arbitrarily selected channel may not provide optimum results.

For example, in a known dual-channel receiver system, one receiver channel (e.g., channel A) of two receiver channels ( e.g., channels A and B) is designated as the "master" channel. The "master" receiver channel is then used to generate the timing recovery signal which is then used to generate the sampling clock signals for that channel (e.g., channel A) and for the other channel (e.g., channel B). The disadvantage of this technique is that if transmission channel A fails, then the two channels (A and B) are rendered inoperable, even if channel B is fully operable; i.e., data can be sent and received via transmission channel B. Also, there are instances where the use of channel A is not suitable and/or desirable such as when the noise on channel A is much greater than that on channel B. Using channel A to generate timing recovery for the receiver system is not optimal, since timing recovery is based on the "noisier", and less desirable, channel.

The disadvantages of the prior art systems discussed above are resolved in systems embodying the invention.

SUMMARY OF THE INVENTION

In a multi-channel receiver system embodying the invention, signal responsive means are coupled to each receiver channel for producing timing signals corresponding to signals received by each channel and for coupling the timing signals from a selected channel to an adjustable clocking circuit for controlling the rate of sampling signals produced by the clocking circuit as a function of the timing signals of the selected channel.

A multi-channel receiver system embodying the invention may include N channels with each channel having an input means for receiving incoming signals; where N is an integer greater than one. A signal responsive means may be coupled to each input means of the receiver for producing N separate timing signals, one timing signal per channel, each timing signal being indicative of the frequency and phase of the signals received at its channel input means. The N separate timing signals are then coupled to a controllable gating means for selectively coupling a selected one of the N timing signals to an adjustable clocking circuit which produces sampling signals corresponding to the timing signals applied thereto.

In a particular embodiment of the invention, the signal responsive means includes N signal frequency responsive means, one per receiver channel, each signal frequency responsive means having an input coupled to a different input means and each having an output for producing a different one of the N separate timing signals.

In a particular embodiment of the invention, the multi-channel receiver system includes means coupled to each channel of the receiver for sensing the signal-to-noise ration (SNR) of the data signals received by each channel and for producing a control signal indicative of which channel has the highest SNR. The control signal is applied to the controllable gating means for coupling the timing signals (or vector) derived from the receiver channel having the highest SNR to the adjustable clocking circuit. Using the timing signals of the receiver channel having the highest SNR causes the best received signal to be selected as the timing recovery input source. A high level of timing recovery performance is achieved by using the timing signals (or vector) from the channel having the highest signal-to-noise ratio (SNR). Thus, whenever a selected transmission channel fails or is noisier than another channel, the timing recovery source will be automatically switched to an active or less noisy channel without disrupting the operation of the active (operative) channel.

In an N-channel receiver embodying the invention, each channel has an input means which may include an analog-to-digital converter (A/D) having an input, an output and a clocking terminal. The A/D of each channel is connected at its input to the input of its receiver channel. The output of each A/D is connected to a frequency responsive means for generating a timing signal corresponding to the signal received by the channel, and to a means for sensing the SNR of the incoming signal. Sampling signals produced by the adjustable clocking circuit are applied to the clocking terminal of each A/D.

In a multi-channel receiver system embodying the invention each one of the signal frequency responsive means may be a band-edge filter and each one of the means for sensing the SNR ratio may include an adaptive equalizer circuit.

In an embodiment of the invention the adjustable clocking circuit includes a phase-locked-loop (PLL), a frequency synthesizer and an oscillator, with the selected timing signals applied to the adjustable clocking circuit for incrementing or decrementing the rate of the sampling clock signals produced by the adjustable clocking circuit.

In a multi-channel receiver system embodying the invention there is also included means for adjusting the phase of selected timing signals when the input to a clocking circuit is switched from the timing signals derived from one receiver channel to the timing signals derived from another receiver channel.

BRIEF DESCRIPTION OF THE DRAWINGS

In the accompanying drawing like reference characters denote like components.

DETAILED DESCRIPTION OF THE INVENTION

Figure 1:
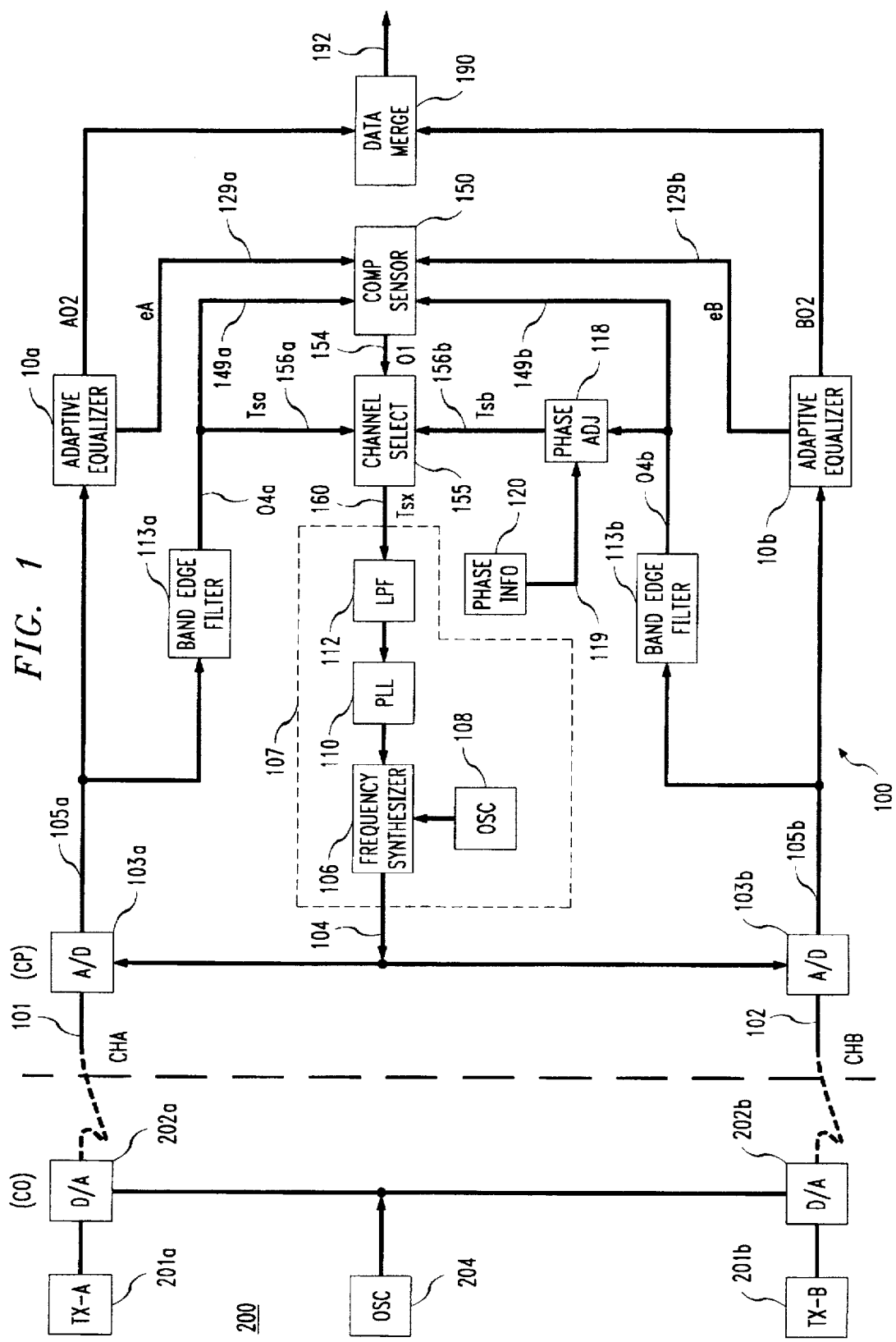
FIG. 1 is a block diagram of pertinent portions of a dual channel high bit-rate digital subscriber line (HDSL) system embodying the invention.

FIG. 1 is a block diagram showing portions of a transmitter-receiver (transceiver) system embodying the invention. The transmitter (Tx) 200 is assumed to be located in a central office (CO) and the receiver 100 is assumed to be located in a customer's premises (CP) or in any location remote from the transmitter. The transmitter (Tx) 200 includes circuitry (not shown) for generating a high speed digital data bit stream (which may be comprised of baseband or passband signals) at some predetermined rate and dividing the stream into two portions; portion "A" or channel A data and portion B or channel B data.

The transmitter (Tx) 200 includes a transmitter, Tx-A, and a digital-to-analog (D/A) converter, 202a, to transmit channel-A data, and a transmitter, Tx-B, and a D/A converter, 202b, to transmit channel-B data. The transmitter 200 includes a master clock 204 in the CO which is coupled to transmit channels A and B and to D/A converters 202a and 202b. Digital signals applied to D/A 202a and 202b are converted into an analog format, and the analog signals at the output of D/A converters 202a and 202b are then propagated via additional filtering, processing and transmitting circuitry (not shown) to corresponding receiver channels. The channel-A data is transmitted over a transmission channel A to the input of a receiver channel A and the channel B data is transmitted over transmission channel B to the input of a receiver channel B.

The various components of the two receiver channels (A and B) are generally similar (except for phase adjustment circuit 118, discussed below). Accordingly, in the appended drawing, like components are denoted by like reference characters with components of channel A being denoted with a suffix "A" or "a", and components of channel B being denoted with a suffix "B" or "b".

Each of transmission channels A and B is typically bidirectional (full-duplex) but, for purpose of simplicity, the description which follows only discusses signal processing in one transmission direction. In the discussion to follow, a transmission channel is defined as the path from the output of a transmitter-channel to the input of its corresponding receiver channel. Each transmission channel has an associated signal propagation delay and phase shift which is generally different from that of the other transmission channel and which may vary with time.

It should be understood that the present invention is applicable to transmission systems using any of a number of suitable modulation schemes as well as to baseband or passband systems and can be used in systems using virtually any baud or bit rate. The signal transmitted through each transmission channel represents a succession of data symbols transmitted at a rate of 1/T symbols per second.

Referring to FIG. 1, incoming channel A data is received on lead 101 and incoming channel B data is received on lead 102. The signals on leads 101 and 102 are respectively coupled through analog-to-digital converters (A/D) 103a and 103b to form channel A and channel B input samples on leads 105a and 105b, respectively. Each one of the A/D converters 103a and 103b is strobed by a common sampling clock signal supplied on line 104 by a frequency synthesizer circuit 106. Frequency synthesizer 106 is part of timing generator and recovery circuit 107, which includes a master clock source, oscillator 108, a phase-locked loop (PLL) 110, and a low pass filter (LPF) 112. Timing recovery circuit 107 provides the same sampling clock signals to A/D 103a and 103b in response to clock signals from oscillator 108 and to timing signals TSx on line 160.

The rate of the sampling clock signals supplied to A/D converters 103a and 103b causes each of these converters to generate line samples at n/T samples per second, where n is a predetermined integer equal to or greater than one. The rate of the sampling clock signals produced on line 104 of timing recovery circuit 107 is updated (i.e., increased or decreased) in response to timing signals (TSx) supplied via line 160 to the input of LPF 112. In systems embodying the invention, the timing signals, TSx, applied to the timing recovery circuit 107 are either equal to the timing signals (TSa) derived via band-edge filter 113a from data signals received at channel A or to the timing signals (TSb) derived via band-edge filter 113b from data signals received at channel B.

The channel A signal samples on line 105a, produced at the output of A/D 103a, are applied to the input of an associated adaptive filter 10a and to the input of an associated band-edge filter 113a. The channel B signal samples on line 105b, produced at the output of A/D 103b, are applied to the input of an associated adaptive filter 10b and to the input of an associated band-edge filter 113b. The band-edge filters 113a, 113b are responsive to the frequency and phase of the signals at their inputs and produce timing signals (TSa, TSb) at their respective outputs which are indicative of the frequency and phase of their input signals.

Band-edge filter 113a produces, at its output, timing signals (TSa) which are derived from the signal samples on line 105a. Likewise, band-edge filter 113b produces, at its output, timing signals (TSb) which are a function of the signal samples on line 105b. The channel A timing signals (TSa) are applied to an input (156a) of a controllable gating circuit, also denoted as channel selector 155. The channel B timing signals (TSb) are applied via a timing vector phase adjustment circuit 118 (detailed below) to another input (156b) of controllable gating circuit 155. Gating circuit 155 may be comprised of a transmission gate arrangement having two inputs (156a, 156b) and a control input, 154, for selectively coupling one of its inputs to its output line, 160. Alternatively, circuit 155 may be any circuit enabling the selective coupling of one of its inputs to its output.

A signal-to-noise ratio (SNR) sensor and comparator 150 whose inputs (line 129a, line 129b) are derived from adaptive equalizers 10a and 10b produces a control signal (O1) on line 154 which is applied to gating circuit 155, to determine whether TSa or TSb gets coupled to circuit 107. In the system of FIG. 1, each adaptive equalizers (10a and 10b) produces an error signal (eA, eB) and a data output (AO2, BO2). The data outputs AO2 and BO2 at the output of equalizers 10a, 10b, respectively, are supplied to a data merge circuit 190 which functions to combine their outputs and to reconstruct on line 192 the original digital data as it existed prior to its division and transmission via the two transmission channels. The error signals eA, eB, are supplied to comparator 150 to determine which channel has the best signal-to-noise ratio (SNR) and to produce a control signal, O1, which is applied to gating circuit 155 to couple the timing signals (TSa or TSb) of the channel having the best SNR to timing recovery circuit 107.

As is known in the art, to varying degrees, inter-symbol interference (ISI) is always present in a data communications system. ISI is the result of the transmission characteristics of the communications channel, i.e., the "channel response," and, generally speaking, causes neighboring data symbols, in a transmission sequence, to spread out and interfere with one another.

Figure 2:
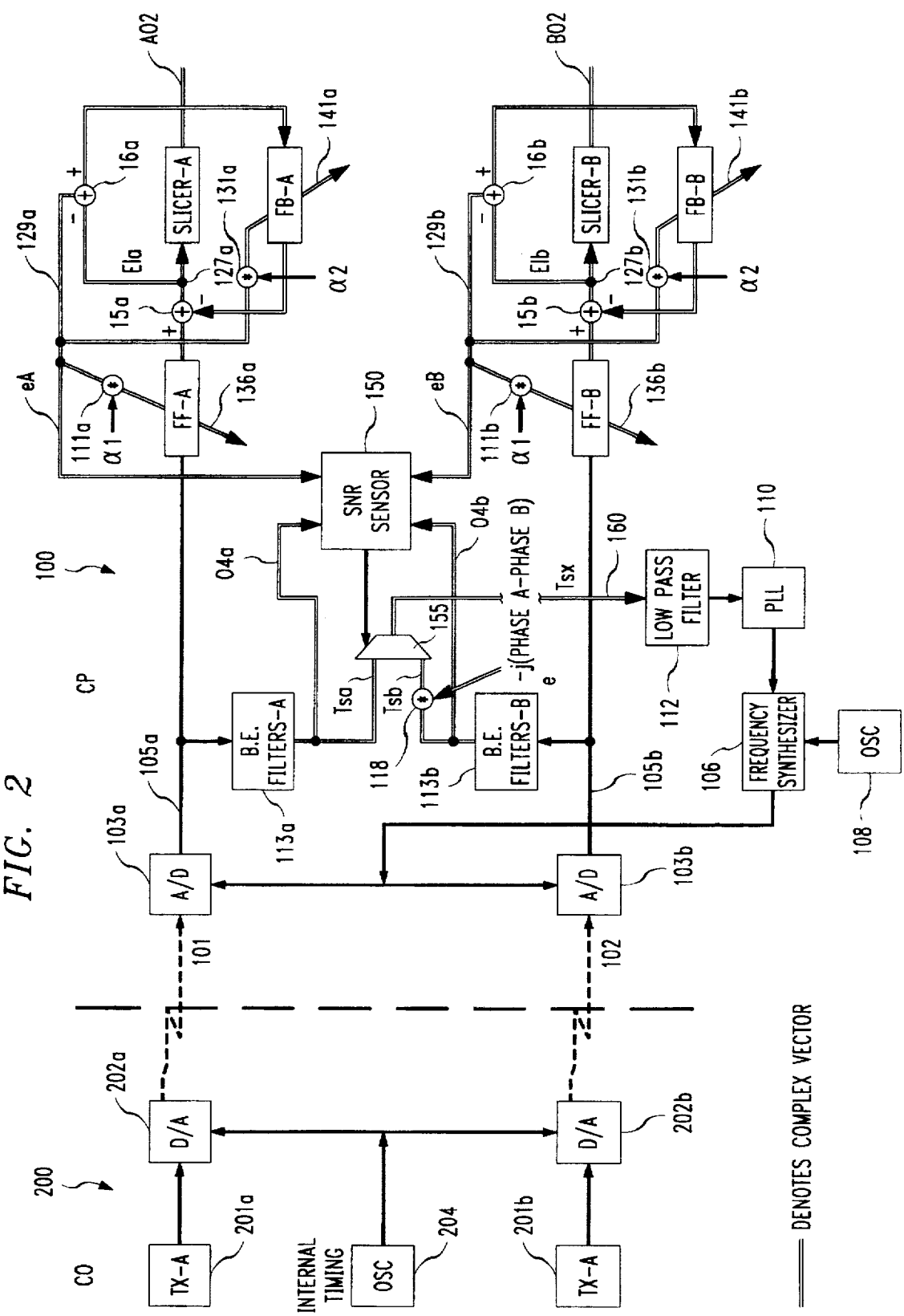
FIG. 2 is a more detailed block diagram of the adaptive filter portions of the system of FIG. 1.

FIG. 2 shows adaptive equalizers 10a, 10b in greater detail and illustrates that, during data transmission, each one of adaptive filters 10a, 10b is configured to form an adaptive decision-feedback equalizer (DFE) which functions to remove ISI in the receiver. Each one of filters 10a and 10b includes an adaptive feed-forward filter section (FFA, FFB), a slicer circuit (slicer-A, slicer-B), an adaptive feedback filter section (FBA, FBB), a first adder (15a, 15b) and a second adder (16a, 16b).

Each feed-forward filter receives and processes n inputs for each symbol interval; whereby each equalizer may be referred to as a fractionally-spaced equalizer and more specifically as a T/n type of fractionally spaced equalizer since each receives and processes n samples per symbol interval. The outputs of filters FFA and FFB are generated once per symbol interval and are respectively coupled through decision circuits slicer-A and slicer-B, which may be any one of a number of "slicer" circuits which function to quantize their coupled equalizer output to the closest one of a plurality of permissible transmitted signal levels.

Each of the feed-forward (FFA, FFB) and feedback (FBA, FBB) filters tends to remove a portion of the ISI. Each of these filters includes a plurality of adjustable coefficients to compensate for the distortions in transmission channels A and B, respectively. Since the distortion in the transmission channels varies with time, these filters are preferably of the automatic or adaptive variety and their coefficients have values which may be varied.

The output of each feed-forward filter is applied to a first input of an associated first adder (15a, 15b). The output of each feedback filter (FBA, FBB) is applied to a second input of its associated first adder circuit (15a, 15b). The output (E1a, E1b) of each first adder (15a, 15b) is applied to the input of a corresponding decision circuit (slicer-A, slicer-B) and to an input of a corresponding second adder (16a, 16b).

In receiver channel A, the output (AO2) of decision circuit slicer-A is connected to a second input of adder 16a and to the input of feedback filter FBA. In receiver channel B, the output (BO2) of decision circuit slicer-B is connected to a second input of adder 16b and to the input of feedback filter FBB.

Adder 16a functions to subtract the slicer-A output from the output (E1a) of comparator 15a to produce an error-A (eA) signal on lead 129a which is used to adapt filters FFA and FBA (i.e., update and adjust their coefficients). In a similar fashion, adder 16b functions to subtract the slicer-B output from the output (E1b) on lead 127b to produce the error-B (eB) signal on lead 129b which is used to adapt filters FFB and FBB.

The error signal eA is applied to multipliers 111a and 131a which multiply eA by a constant or step size, $\alpha 1$ and $\alpha 2$, respectively, to produce resultant signals on line 136a and 141a which are used to adapt FFA and FBA, respectively. The error signal eB is applied to multipliers 111b and 131b which multiply eB by a constant or step size, $\alpha 1$ and $\alpha 2$, respectively, to produce resultant signals on lines 136b and 141b which are used to adapt FFB and FBB, respectively.

To better understand the operations of the equalizers (10a, 10b), note that, as to each equalizer, the output signals from a feed-forward filter (FF) and a corresponding feedback filter are applied to an adder (15a, 15b) which, theoretically, subtracts the remaining portion of the ISI removed by a feedback filter (FBA, FBB) from the output signal of a feed forward filter (FFA, FFB). The first adder (15a, 15b) provides a signal on a line (127a, 127b) which is applied to a second adder (16a, 16b) and to a slicer circuit. The slicer circuit (A, B) selects a particular data symbol as a function of the mapping of the signal at its input to a point in a predefined constellation of data symbols (not shown). The slicer circuit provides a data symbol every T seconds, where 1/T is the data symbol rate. This data symbol is an estimate of the received symbol and is provided at the slicer circuit output (AO2, BO2) for processing by other receiver circuitry (not shown) to recover the actually transmitted data.

The output (AO2, BO2) of each slicer circuit is also provided to its feedback filter (FBA, FBB) and adder (16a, 16b). Feedback filter (FBA, FBB) predicts the amount of ISI present in the received signal and provides an ISI prediction signal to the first adder (15a, 15b). The first adder (15a, 15b), as described above, removes the remaining portion of ISI from the received signal by subtracting the ISI prediction signal from the output signal of the feed-forward filter (FFA, FFB).

The second adder (16a, 16b) subtracts the estimated data symbol provided at the output of its slicer circuit from the ISI-reduced signal present at its input to provide an ERROR signal (eA, eB) on line 129. The ERROR signal represents the amount of ISI error and channel noise that has not been corrected by the operation of either feed-forward filter FF or feedback filter FB. The ERROR signal is used to adapt both feed-forward filter (FF) and feedback filter (FB) via multipliers 111 and 131. It is assumed that the adaptation algorithms (not shown) of the feed-forward and feedback filters conform to the use of minimum mean square error (MMSE), zero forcing, or its variations, as is known in the art.

If it is assumed that the slicer output is equal to the transmitted data symbols (no decision errors), then, the error signal (eA, eB) at the output of adder 16 represents the amount of channel noise that has not been corrected by operation of the DFE.

Figure 3:
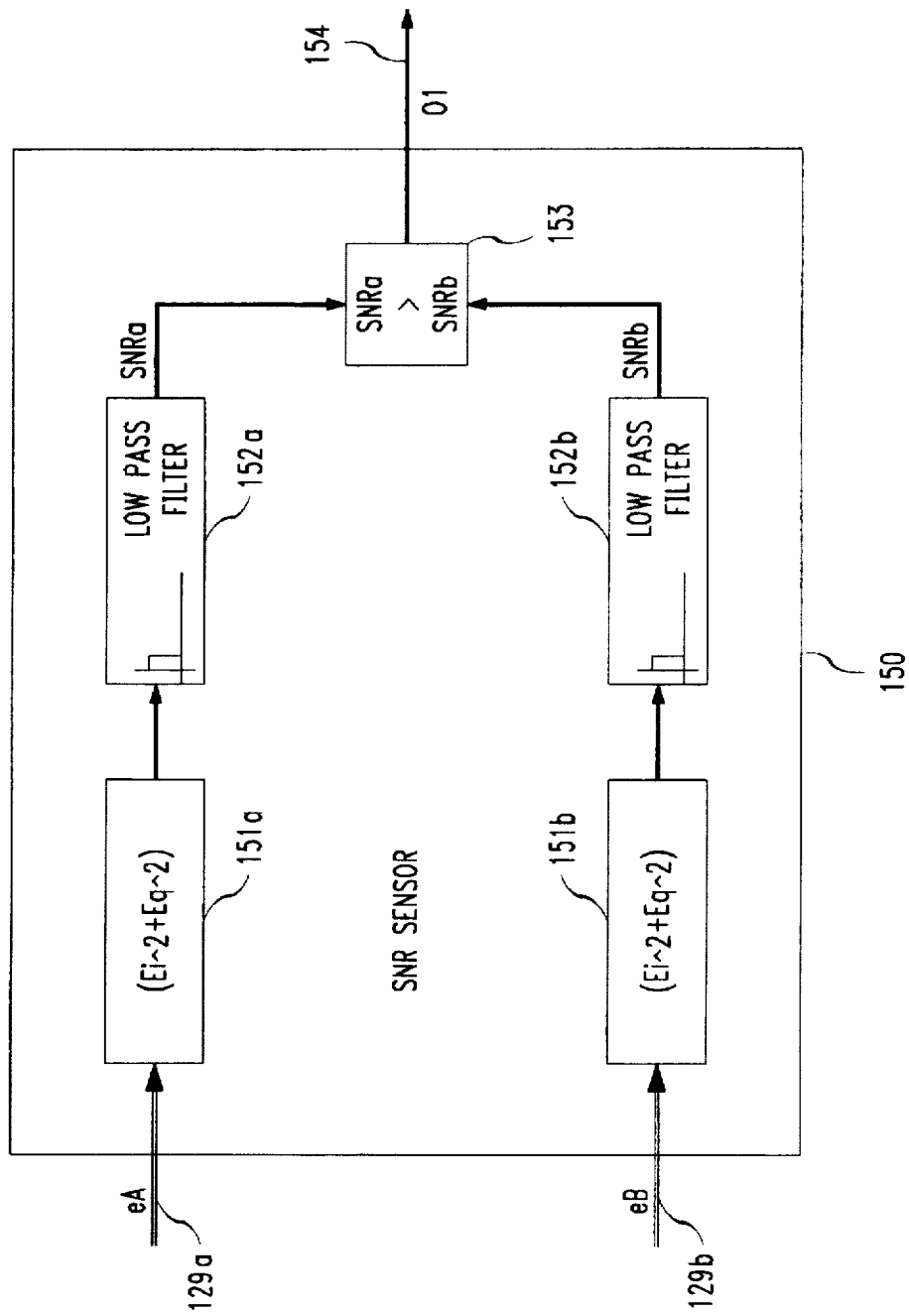
FIG. 3 is a diagram illustrating a signal-to-noise ratio (SNR) sensor and comparator arrangement suitable for use in systems embodying the invention.

The error signal (eA) from channel A and the error signal (eB) from channel B are applied to a signal-to-noise ratio (SNR) sensor 150. The processing of the error signals (eA, eB) and the comparison of the resultant signals is best explained with reference to FIG. 3. The in-phase and quadrature components of the error vector (eA) from channel A are squared and summed by a "squarer" 151a. The output of squarer 151a is then supplied to a low pass filter (LPF) 152a which functions to smooth out the error fluctuation to prevent switching on any instantaneous error. The output of LPF 152a is a signal (SNRa) representative of the signal-to-noise ratio (SNR) of the signal received at the input of channel A. Likewise, the in-phase and quadrature components of the error vector (eB) from channel B are squared and summed in a squarer 151b and then supplied to an LPF 152b whose output, SNRb, is a signal representative of the signal-to-noise ratio (SNR) of the signal propagated along channel B. This squaring and summing operation and the subsequent low pass filtering may be accomplished by dedicated analog or digital circuitry or by supplying the vector signal to a receiver based microprocessor or controller to perform the required computations.

The signals SNRa and SNRb are supplied to a comparator 153 to produce an output signal O1 on line 154, having a first value when SNRa is greater than SNRb and having a second value when SNRa is less than SNRb. The comparator 153 may be an analog or a digital circuit. Alternatively, the comparison may be performed by a receiver based microprocessor (not shown).

The output O1 of the SNR sensor 150 is fed to a two-input multiplexing gate (MUX) 155 (See FIGS. 1, 2, 4) and controls which input of gate 155 gets coupled to the gate output 160. When SNRa is greater than SNRb, the O1 signal from sensor 150 will cause MUX 155 to couple channel A data-derived timing signals to timing recovery circuit 107. When SNRa is less than SNRb, the O1 signal from sensor 150 will cause MUX 155 to couple channel B data-derived timing signals to timing recovery circuit 107.

Figure 4:
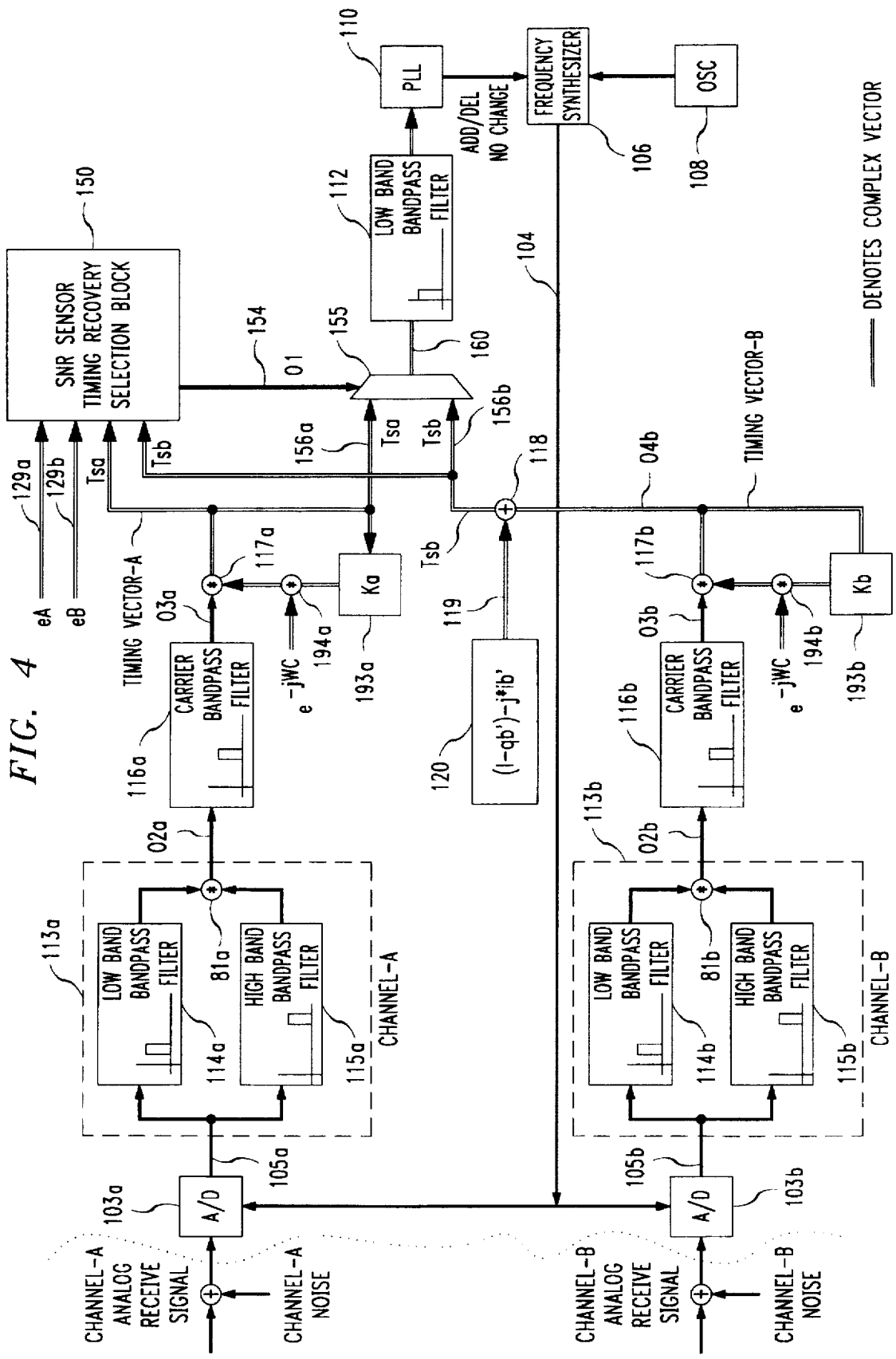
FIG. 4 is a diagram illustrating timing recovery filters suitable for use in systems embodying the invention.

A more detailed description of band-edge filters 113a and 113b and their interconnection to produce timing signals which are selectively supplied to timing recovery circuit 107 is illustrated in FIG. 4. FIG. 4 shows that the received input signal to A/D 103a includes a channel-A analog receive signal and channel A noise and the received input signal to A/D 103b includes a channel-B analog receive signal and channel B noise. A/D converters 103a, 103b are sampled by the sampling clock present on line 104. The channel A and channel B samples are supplied to respective band-edge filters 113a, 113b which, in FIG. 4, are implemented using a low-band bandpass filter (114a, 114b) and a high-band bandpass filter (115a, 115b) whose outputs are multiplied via multipliers 81a, 81b, respectively, to produce symbol rate information (O2a, O2b) which includes the sum and difference of the signal frequencies.

The symbol rate information (O2a, O2b) at the output of each multiplier (81a, 81b) is respectively supplied to a carrier bandpass filter (116a, 116b) to select the difference of the signal frequencies and thus effectuate carrier recovery. The output O3a produced at the output of carrier bandpass filter 116a is supplied to a demodulator 117a to produce an output signal O4a (timing vector-A) which corresponds to the frequency and phase of the data received on channel A. In a similar manner, the output O3b produced at the output of carrier bandpass filter 116b is supplied to a demodulator 117b to produce output signal O4b, (timing vector-B) which corresponds to the frequency and phase of the data received on channel B.

In FIG. 4, the channel A timing vector O4a is fed to a normalizer circuit 193a and the channel B timing vector O4b is fed to a normalizer circuit 193b, each one of normalizer circuits 193a and 193b functioning to normalize their respective timing vectors to have a magnitude of 1. The function of circuits 193a, 193b may be performed by means of a microprocessor (not shown) or dedicated circuitry. The output of circuit 193a is modulated via modulator 194a to produce a modulated signal supplied to demodulator 117a. Likewise, the output of circuit 193b is modulated via modulator 194b to produce a modulated signal applied to demodulator 117b. In response to the signals at their inputs, demodulators 117a and 117b produce timing signals at their respective outputs O4a, O4b, identified as timing vectors A and B, respectively.

Signal O4a (also denoted as TSa) is supplied to one signal input (156a) of the two-input controllable multiplexing gate (MUX) 155. Signal O4b is coupled to phase offset adjust circuitry 118 to produce the signal TSb which is applied to the other signal input (156b) of MUX 155. Phase offset adjust circuitry 118 is designed to compensate and reduce the production of an error signal when the timing recovery circuit signal is switched from channel A to channel B (or vice versa). Channels A and B are always operated at the same frequency. In an HDSL configuration, the frequency of channel B data is the same as the frequency of the channel A data (i.e., there is no frequency offset) and the clocking signal would not change. However, the propagation delay along transmission channel B may be different than the delay in transmission channel A. As a result, there is a phase offset between the timing vectors derived from the data on channels A and B since the received data is propagated along different transmission channels. When the timing recovery is locked-in on one channel, the phase of that channel controls. Assume, for example, that timing recovery is locked in on channel A and that it is then desired to switch the timing recovery to channel B. Assuming that the receiver is trained using the timing vector (TSa) derived from channel A, the PLL locks the synthesizer such that the timing vector has zero phase offset between the channel timing vector and the channel received analog signal. If MUX 155 is switched from channel A to the channel B such that timing vector B at O4b is substituted for timing vector A at O4a, without compensating for received signal phase offset, the PLL will see an "erroneous" large error before it re-converges to a new timing phase in respect to its own received analog signal. The apparent false error in the timing vector will degrade performance. Therefore, to prevent an erroneous error indication, the phase of the O4b signal must be adjusted for the offset between the timing vector of the B channel and the timing vector of the A channel. The phase offset between timing vectors A and B may be measured during the startup (or "training") of the two channels and then stored. The stored information is subsequently used to adjust the phase of timing vector B when it is submitted for timing vector A, whereby the "glitch" in the PLL is reduced to a minimum whenever the SNR sensor switches the source of the timing vector to the PLL.

Figure 5:
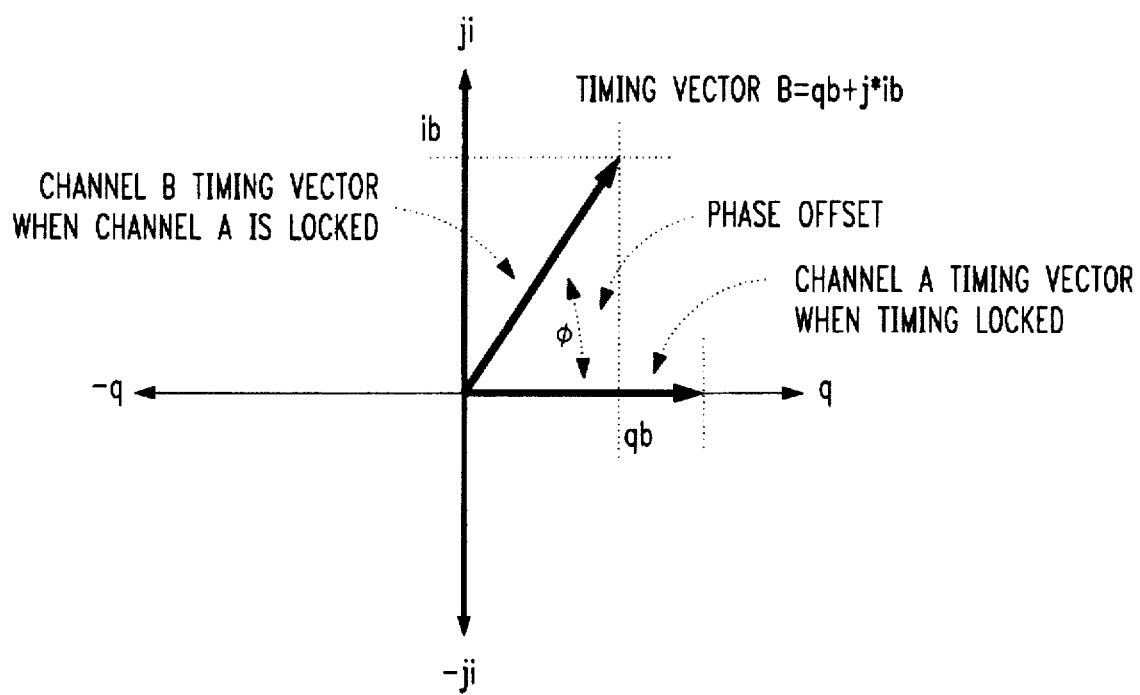
FIG. 5 is a vector diagram illustrating phase offset adjustment in systems embodying the invention.

The phase adjustment is best explained with reference to FIG. 5. When channel A is converged, it may be assumed that:

Timing vector $A=Ka[q_a+j*O]=1$   eq. 1

Timing vector $B=Kb[q_b+j*b]=1$   eq. 2

Both vectors must be normalized such that:

$$Kb[\sqrt{(qb)^2 + (ib)^2}] = Ka[\sqrt{(qa)^2 + (ia)^2}] = 1$$

When timing recovery is set (locked) using channel A, the $j*ia$ value of the vector is equal to zero. After switching from channel A to channel B, in order to rotate the timing vector of channel B so it will have the same phase offset as channel A which was the active channel, the timing vector of channel B must be scaled with the following:

$$qb''=qb-(1-qb')$$

$$ib''=ib-ib'$$

where:

ib" and qb" are the new values of i and q into the MUX 155.

ib, qb=current timing vector
ib', qb'=offset saved when channel A is locked.

With timing vector B so adjusted, channel B can be used to provide the frequency control for the timing recovery circuit without any sharp, or false, disruption in the timing circuitry.

The dual channel timing recovery algorithm picks the channel with the best SNR as the master source for the initial training and calculates the phase offset between the timing vector. The timing vector will be the ideal phase vector the slave channel will converge to.

In data mode (i.e., when a data signal is being transmitted from the transmitter to the receiver), by monitoring the received signal SNR, the transceiver will automatically switch the PLL input to the signal with the highest SNR. As a result of the automatic switching, if the channel from which the timing is derived goes down, the timing source will be switched to the other channel that has no disruption.

Since the PLL steady state step size is small the timing will stay locked. The phase jump as a result of the switch will be small enough for the equalizer to track it since the phase offset between the channels was calculated during the initial "training" period.

In practice, during a "training period", the timing vector of the channel having the highest SNR (e.g., CH-A) may be selected as the master channel and the values of its timing vector may be calculated and stored. Concurrently, the timing vector of the other channel (e.g., CH-B) may also be calculated and stored. The phase information of the other channel (e.g., CH-B) is then stored in a storage means 120 which may be a dedicated register or part of a microprocessor. Subsequently, if the SNR of the one channel (e.g., CH-A) degrades relative to the SNR of the other channel (e.g., CH-B), the timing vector of the other channel (e.g., CH-B) is adjusted by applying the stored phase information via line 119 to phase adjust circuit 118 whereby the timing vector of the other channel (e.g., CH-B) is then used and applied to timing recovery circuit 107 after its phase offset has been adjusted.

It should be appreciated that at the beginning of a "training" period (before the receiver system has been "trained"), the adaptive equalizers (10a, 10b) do not provide an accurate assessment of the SNR of the receiver channels. Accordingly, during training, which receiver channel is used as the "master" channel for timing recovery may be set arbitrarily. Alternatively, the outputs (O4a, O4b or TSa, TSb) of the band edge filters may be used to sense the SNR of the received signals. For example, in FIGS. 1 and 2, the outputs O4a and O4b are applied via lines 149a, 149b to the comparator-sensor 150. In FIG. 4, the timing vector TSa and the phase adjusted timing vector TSb are applied to SNR sensor 150. This illustrates that the timing vector (O4a, O4b or TSa, TSb) may itself be used to select the timing recovery source. The timing vectors would be filtered and the amount of filter or deviation from the ideal setting could be used as an indication of the signal-to-noise ratio of the signals received on the different channels. Although the timing vector may be used, it is preferable during the data mode to use the equalizer error vector (eA, eB) which tends to be more accurate.

The invention has been illustrated using two channels (A,B). However, it should be evident that more than two transmitting channels and more than two receiving channels may be used in systems embodying the invention; i.e., there may be "N" channels where N is an integer greater than one (1).

The outputs (eA, eB) of the adaptive equalizers have been used to generate the SNR. However, it should be understood that other signal points also may be used. Also, other means for determining the SNR of the received signals may be used to determine which channel is used to control the timing recovery circuit.

The timing signals input to timing recovery circuit 107 were derived from band-edge filters coupled to each channel receiver input. However, it should be evident that data derived frequency and phase signals usable to control the timing recovery circuit may be derived from other circuits (e.g., adaptive equalizers).

The invention has been illustrated using the SNR of the various channels to determine the timing vector of which channel is used to control timing recovery circuit 107. However, it should be noted that different criteria may be used to select a channel whose timing vector is to be coupled to timing recovery circuit 107 and to then selectively couple the selected channel to the input of the timing recovery circuit 107.

What is claimed is:

1. An N-channel receiver system comprising:

N input means, one input means per channel, for receiving transmitted signals, where N is an integer greater than one;

a signal responsive means, coupled to each one of the N input means for producing N separate timing signals, one timing signal per receiver channel, indicative of the frequency and phase of the signal received at its input means;

an adjustable clocking circuit having an input and an output for producing sampling signals at its output which are responsive to timing signals applied to its input;

a controllable gating means having N inputs and an output;

means for coupling each one of said N separate timing signals to a different one of said N inputs of said controllable gating means; and means coupling the output of said controllable gating means to the input of said adjustable clocking circuit for selectively applying a selected one of the timing signals to the input of the adjustable clocking circuit.

2. An N-channel receiver system as claimed in claim 1, wherein said signal responsive means includes N signal frequency responsive means, one per receiver channel, and each having an input and an output;

wherein said controllable gating means includes:
(a) means coupled to each channel of the receiver for sensing the signal-to-noise ratio (SNR) of the data signals received by each channel and for producing a control signal indicative of which channel has the highest SNR; and
(b) coupling the output of said controllable gating means to the input of said adjustable clocking means for applying thereto the timing signals of a selected one of said N signal frequency responsive means.

3. An N-channel receiver as claimed in claim 2, wherein each one of said N input means includes an analog-to-digital converter (A/D); wherein each A/D has:
(a) an input for receiving signals;
(b) a sampling terminal for the application thereto of said sampling signals produced by said adjustable clocking circuit; and
(c) an output at which is produced signal samples of the signals received at the input of the A/D.

4. An N-channel receiver as claimed in claim 3, wherein each one of said N signal frequency responsive means includes a timing recovery filter means per channel;

wherein a timing recovery filter means is coupled between the output of each A/D and a different one of the N inputs of the controllable gating means;

wherein said controllable gating means has a control terminal;

wherein the control signal is applied to the control terminal of the controllable gating means for controlling which input of the gating means is coupled to its output; and wherein the output of the controllable gating means is coupled to the input of the adjustable clocking circuit for supplying it with selected timing signals.

5. An N-channel receiver as claimed in claim 4, wherein said means coupled to each channel of the receiver for sensing the SNR includes: (a) an adaptive equalizer per channel coupled to the output of the A/D of the receiver channel for producing, for each channel, a first signal indicative of the SNK of its corresponding receiver; and (b) a comparator for receiving the first signal produced by all the adaptive equalizers for producing said control signal indicative of which receiver channel has the highest SNR.

6. An N-channel receiver as claimed in claim 5, wherein said means coupled to each channel of the receiver for sensing the SNR includes:

(a) an adaptive equalizer per channel, each adaptive equalizer having an input, coupled to the output of a corresponding A/D, a first output at which is produced a signal indicative of the SNR of the received signal, and a second output at which is produced a signal corresponding to the transmitted data signal; and (b) comparator means coupled to the first output of each adaptive equalizer for producing said control signal.

7. An N-channel receiver as claimed in claim 5, wherein the timing signals of a first channel are coupled to an input of the gating means; and wherein the timing signals of a second channel are coupled via a phase offset adjustment circuit to another input of the gating means for reducing the difference in phase between the timing signals of the first and second channels when the timing signals of the second channel are substituted for the timing signals of the first channel.

8. An N-channel receiver as claimed in claim 5, wherein said adjustable clocking circuit includes a phase locked loop (PLL), a frequency synthesizer and a master oscillator; and wherein the sampling signals are produced at the output of the frequency synthesizer.

9. An N-channel receiver as claimed in claim 2, wherein said means coupled to each channel of the receiver for sensing the SNR ration includes:

(a) an adaptive equalizer per channel of the receiver for producing, for each channel, a first signal indicative of the SNR of its corresponding receiver; and (b) a comparator for receiving the first signal produced by all the adaptive equalizers for producing said control signal indicative of which receiver channel has the highest SNR.

10. An N-channel receiver as claimed in claim 1, wherein said means for coupling each one of said N separate timing signals to a different one of said N inputs of said controllable gating means includes phase offset adjustment means for compensating for phase difference in timing signals when the timing signals of a channel are selected to be coupled to the input of the adjustable clocking circuit instead of the timing signals of another channel.

11. An N-channel receiver system as claimed in claim 1, wherein each receiver channel is adapted to receive a different portion of a signal to be reconstructed.

12. An N-channel receiver as claimed in claim 2, wherein said signal frequency responsive means includes a timing recovery filter means per channel;

wherein said controllable gating means has one input per channel, a control terminal and an output;

wherein each timing recovery filter means is coupled between a receiver channel and a different input of the gating means;

wherein the control signal is applied to the control terminal of the controllable gating means for controlling which input of the gating means is coupled to its output; and wherein the output of the gating means is coupled to the input of the adjustable clocking circuit for supplying it with selected timing signals.

13. A multi-channel receiver system comprising:

an adjustable clocking circuit having an input and an output for producing sampling signals at its output which are responsive to timing signals applied to its input;

means coupled to each channel of the receiver for sensing the signal-to-noise ration (SNR) of data signals received by each channel and for producing a control signal indicative of which channel has the highest SNR;

signal frequency responsive means coupled to each channel of the receiver for producing a timing signal for each receiver channel corresponding to the frequency and phase of the signals received by each channel; and gating means coupled to said frequency responsive means and responsive to the control signal for selectively supplying to the input of the adjustable clocking circuit the timing signals from the receiver channel having the highest SNR.

14. A multi-channel receiver system as claimed in claim 13, wherein each channel is adapted to receive a different portion of a signal to be reconstructed.

15. A multi-channel receiver as claimed in claim 13, wherein said signal frequency responsive means includes a timing recovery filter means per receiver channel;

wherein said gating means has one input per receiver channel, a control input terminal and an output;

wherein each timing recovery filter means is coupled between a receiver channel and a different input of the gating means;

wherein the control signal is applied to the control input terminal of the gating means for controlling which input of the gating means is coupled to its output; and wherein the output of the gating means is coupled to the adjustable clocking circuit for supplying it with selected timing signals.

16. A multi-channel receiver as claimed in claim 15, wherein said means coupled to each channel of the receiver for sensing the SNR includes: (a) an adaptive equalizer per channel coupled to the output of the A/D of the receiver channel for producing, for each channel, a first signal indicative of the SNR of its corresponding receiver; and (b)

a comparator for receiving the first signal produced by all the adaptive equalizers for producing said control signal indicative of which receiver channel has the highest SNR.

17. A multi-channel receiver as claimed in claim 16,
wherein the timing signals of a first channel are coupled to an input of the gating means; and
wherein the timing signal of a second channel are coupled via a phase offset adjustment circuit to another input of the gating means for reducing any difference in phase between the timing signals of the first channel and those of the second channel when the timing signals of the second channel, instead of those of the first channel, are coupled via the gating means to the input of the adjustable clocking circuit.

18. A multi-channel receiver as claimed in claim 13,
wherein each channel of the receiver includes an analog-to-digital converter (A/D); with each A/D having an input for receiving signals, a sampling terminal for the application thereto of said sampling signals produced by said adjustable clocking circuit, and an output at which is produced signal samples of the signals received at the A/D input.

19. A multi-channel receiver as claimed in claim 18,
wherein said signal frequency responsive means includes a timing recovery filter means per channel;
wherein said gating means has one input per channel, a control input terminal and an output;
wherein a timing recovery filter means is coupled between the output of an A/D of a receiver channel and a different input of the gating means;
wherein the control signal is applied to the control input terminal of the gating means for controlling which input of the gating means is coupled to its output; and
wherein the output of the gating means is coupled to the adjustable clocking circuit for supplying it with selected timing signals.

20. A multi-channel receiver as claimed in claim 19, wherein said means coupled to each channel of the receiver for sensing the SNR includes: (a) an adaptive equalizer per channel coupled to the output of the A/D of the receiver channel for producing, for each channel, a first signal indicative of the SNR of its corresponding receiver; and (b) a comparator for receiving the first signal produced by all the adaptive equalizers for producing said control signal indicative of which receiver channel has the highest SNR.

21. A multi-channel receiver as claimed in claim 20,
wherein said means coupled to each channel of the receiver for sensing the SNR includes:
(a) an adaptive equalizer per channel, each adaptive equalizer having an input, coupled to the output of a corresponding A/D, a first output at which is produced a signal indicative of the SNR of the received signal, and a second output at which is produced a signal corresponding to the transmitted data signal; and
(b) comparator means coupled to the first output of each adaptive equalizer for producing said control signal.

22. A multi-channel receiver as claimed in claim 20,
wherein the timing signals of a first channel are coupled to an input of the gating means; and
wherein the timing signal of a second channel are coupled via a phase offset adjustment circuit to another input of the gating means for compensating for any difference in phase between the timing signals of the first and second channels when the second channel is coupled to the output of the gating means after the first channel is decoupled therefrom.

23. A multi-channel receiver system comprising:
an adjustable clocking circuit for producing sampling signals in response to timing signals;
means coupled to each channel of the multi-channels of the receiver for sensing the signal-to-noise ration (SNR) of the data signals received by each channel and for producing a control signal indicative of which channel has the highest SNR; and
means coupled to each channel of the multi-channels of the receiver for producing timing signals responsive to the frequency of the signals received by each channel and including means responsive to the control signal for supplying timing signals derived from the channel having the highest SNR to the adjustable clocking circuit for producing sampling signals which are a function of the signals received by the channel of the multi-channel receiver having the highest SNR.

24. A combination comprising:
first and second input terminals for respectively receiving first and second portions of a data signal;
first and second analog-to-digital converters (A/Ds); each A/D having an input and an output; said first A/D being coupled at its input to said first input terminal and said second A/D being coupled at its input to said second input terminal; each A/D having a sampling terminal for the application thereto of a sampling signal for controlling the rate at which it Samples the data received at its input;
a first means coupled to the outputs of the first and second A/D for producing at a first output terminal information relative to the frequency of the data received at said first input terminal and for producing at a second output terminal information relative to the frequency of the data received at said second input terminal;
a second means coupled to the outputs of the first and second A/Ds for sensing the signal to noise ratio (SNR) of the data received on each channel and for producing a control signal indicating which channel has the higher SNR; and
selector means responsive to the control signal for coupling that one of the first and second output terminal whose data has the higher SNR to an adjustable timing recovery circuit signal for generating the sampling signals for the A/Ds.

25. A multi-channel receiver with each channel having an input terminal for receiving different portions of a data signal, comprising:
an analog-to-digital converter (A/D) per channel; each A/D having an input and an output; each A/D being coupled at its input to a corresponding input terminal; each A/D having a sampling terminal for the application thereto of sampling signals for controlling the rate at which the A/D samples the data signals received at its input;
controllable sampling means, coupled to each A/D, responsive to a timing signal for producing sampling signals which are a function of the frequency of the data signals received by the receiver and for supplying the same sampling signals to all the A/D's;
means coupled to the output of each A/D for sensing which A/D has the highest signal-to-Noise ratio (SNR) and for producing a control signal indicative thereof;

means coupled to the output of each A/D for sensing the frequency of the data signals received by each receiver channel and producing a corresponding timing signal; and means responsive to the control signal for supplying the timing signal of the receiver channel having the highest SNR to the controllable sampling means.

* * * * *

UNITED STATES PATENT AND TRADEMARK OFFICE
CERTIFICATE OF CORRECTION

PATENT NO. : 5,703,905
DATED : Dec. 30, 1997
INVENTOR(S) : E. Langberg

It is certified that error appears in the above-identified patent and that said Letters Patent is hereby corrected as shown below:

In The Abstract:

in the last sentence, after "controllable", insert - -mechanism- -.

In The Specification:

Column 2, line 19, after "signal-to-noise", delete "ration", and insert - -ratio- -.

Column 2, line 66, after "accompanying", delete "drawing", and insert - -drawings- -.

In The Claims:

Column 11, line 21, after "indicative of the", delete "SNK", and insert - -SNR- -.

Column 12, line 32, after "signal-to-noise", delete "ration", and insert - -ratio- -.

Column 14, line 31, after "which it", delete "Samples", and insert - -samples- -.

Column 14, line 66, after "highest", delete "signal-to-Noise", and insert - -signal-to-noise- -.

Signed and Sealed this

First Day of December, 1998

*Attest:*

BRUCE LEHMAN

*Attesting Officer*     *Commissioner of Patents and Trademarks*